(12) United States Patent
Nakayama

(10) Patent No.: US 10,933,540 B2
(45) Date of Patent: Mar. 2, 2021

(54) ROBOT LINK-CONSTITUTING MEMBER AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 76 days.

(21) Appl. No.: 16/374,873

(22) Filed: Apr. 4, 2019

(65) Prior Publication Data

US 2019/0344454 A1 Nov. 14, 2019

(30) Foreign Application Priority Data

May 9, 2018 (JP) .............................. JP2018-090761

(51) Int. Cl.
*B25J 18/00* (2006.01)
*B25J 9/00* (2006.01)

(52) U.S. Cl.
CPC .............. *B25J 18/00* (2013.01); *B25J 9/0009* (2013.01)

(58) Field of Classification Search
CPC ................................ B25J 18/00; B25J 9/0009
See application file for complete search history.

(56) References Cited

U.S. PATENT DOCUMENTS

| 3,121,348 | A | 2/1964 | Reed |
| 4,529,460 | A | 7/1985 | Hasegawa et al. |
| 5,744,728 | A | 4/1998 | Suita et al. |
| 9,662,795 | B2 * | 5/2017 | Yamaguchi .......... B25J 19/0075 |
| 10,022,861 | B1 * | 7/2018 | He ............................ B25J 9/126 |
| 10,220,508 | B2 * | 3/2019 | Yokota ....................... B25J 9/06 |
| 10,456,907 | B2 * | 10/2019 | Nakayama ................. B25J 9/06 |
| 10,603,801 | B2 * | 3/2020 | Zhu ...................... B25J 19/0075 |
| 2010/0062278 | A1 | 3/2010 | Quell et al. |
| 2010/0224023 | A1 | 9/2010 | Long et al. |
| 2012/0198955 | A1 * | 8/2012 | Hayashi ................... B25J 9/046 |
| | | | 74/490.05 |

(Continued)

FOREIGN PATENT DOCUMENTS

| CN | 204935673 U | 1/2016 |
| EP | 0 689 903 A1 | 1/1996 |

(Continued)

OTHER PUBLICATIONS

Japanese Office Action dated Jul. 7, 2020, in connection with corresponding JP Application No. 2018-090761 (12 pp., including machine-generated English translation).

(Continued)

*Primary Examiner* — David M Fenstermacher
(74) *Attorney, Agent, or Firm* — Maier & Maier, PLLC

(57) ABSTRACT

To simplify production, a hollow-structure robot link-constituting member is obtained by joining two or more formed members obtained by press-forming steel sheets. Compared to when the robot link-constituting member is formed of castings, the thickness can be easily reduced and high strength can be maintained by forming a hollow structure by joining at least two formed members obtained by press-forming steel sheets. In this manner, significant weight reduction can be achieved compared to iron castings, and occurrence of defects can be reduced compared to aluminum alloy castings.

16 Claims, 18 Drawing Sheets

(56) References Cited

U.S. PATENT DOCUMENTS

| | | |
|---|---|---|
| 2013/0241239 A1 | 9/2013 | Mori |
| 2013/0255428 A1* | 10/2013 | Hahakura ............... B25J 18/00 74/490.03 |
| 2013/0255429 A1* | 10/2013 | Hahakura ............... B25J 17/00 74/490.05 |
| 2014/0047940 A1 | 2/2014 | Yamamoto |
| 2014/0283642 A1 | 9/2014 | Harada et al. |
| 2014/0338490 A1* | 11/2014 | Shinabe ............... B25J 9/0009 74/490.03 |
| 2016/0046328 A1 | 2/2016 | Steffens et al. |
| 2017/0001489 A1 | 1/2017 | Mosteiro Goyoaga |
| 2017/0095936 A1 | 4/2017 | Fukuoka et al. |

FOREIGN PATENT DOCUMENTS

| | | |
|---|---|---|
| EP | 1 949 981 A1 | 7/2008 |
| EP | 2 781 317 A1 | 9/2014 |
| EP | 2 808 132 A1 | 12/2014 |
| EP | 3 112 193 A1 | 1/2017 |
| JP | S58-177292 A | 10/1983 |
| JP | S59-74086 U | 5/1984 |
| JP | S60-150980 A | 8/1985 |
| JP | H08-11085 A | 1/1996 |
| JP | H09-254621 A | 9/1997 |
| JP | H11-10687 A | 1/1999 |
| JP | 2004-156474 A | 6/2004 |
| JP | 2006-315161 A | 11/2006 |
| JP | 2007-038269 A | 2/2007 |
| JP | 2008-178968 A | 8/2008 |
| JP | 2010-516531 A | 5/2010 |
| JP | 2012-121416 A | 6/2012 |
| JP | 2014-037044 A | 2/2014 |
| JP | 2014-162327 A | 9/2014 |
| JP | 2014-180731 A | 9/2014 |
| JP | 5729410 B2 | 6/2015 |
| JP | 5772875 B2 | 9/2015 |
| JP | 2016-041579 A | 3/2016 |
| WO | 2008/001435 A1 | 1/2008 |
| WO | 2012/076948 A1 | 6/2012 |
| WO | 2015145576 A1 | 4/2017 |

OTHER PUBLICATIONS

Japanese Search Report dated May 26, 2020, in connection with corresponding JP Application No. 2018-090761, (25 pp., including machine-generated English translation).

Japanese Office Action dated Dec. 1, 2020, in connection with corresponding JP Application No. 2018-090761 (13 pp., including machine-generated English translation).

* cited by examiner

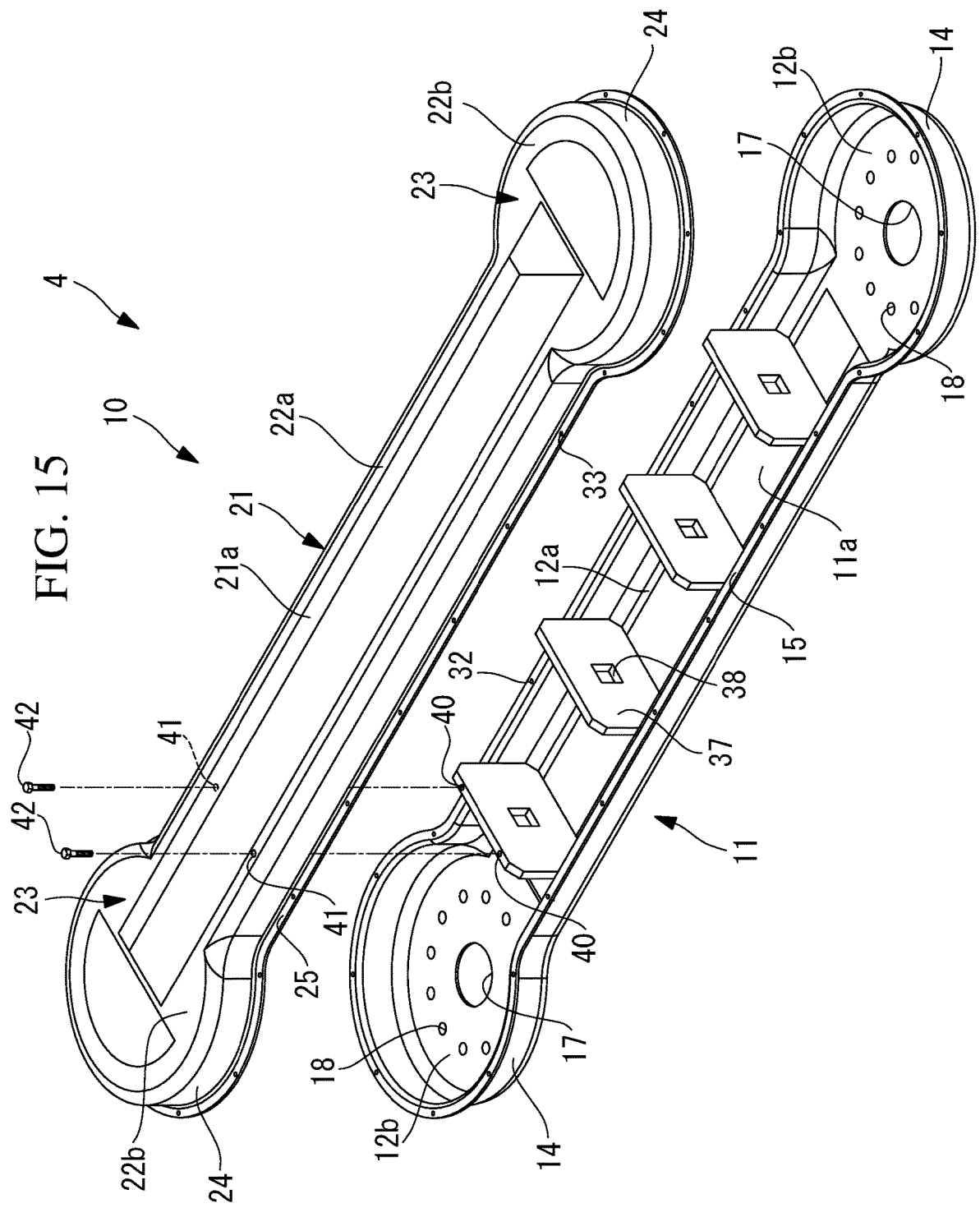

ROBOT LINK-CONSTITUTING MEMBER AND ROBOT

CROSS-REFERENCE TO RELATED APPLICATIONS

This application is based on Japanese Patent Application No. 2018-090761, the contents of which are incorporated herein by reference.

FIELD

The present invention relates to a robot link-constituting member and a robot.

BACKGROUND

In general, link-constituting members such as arms and casings of industrial robots are formed of iron castings or aluminum alloy castings (for example, see The Publication of Japanese Patent No. 5729410).

SUMMARY

According to one aspect of the present invention, there is provided a hollow-structure robot link-constituting member obtained by joining at least two formed members formed by press-forming steel sheets.

In the aspect described above, the formed members may each have a rib on a surface, the rib being formed by an irregularity on the surface.

In the aspect described above, each the formed members may have flange portions around perimeters, the flanged portions being superimposed on each other and joined to each other.

In the aspect described above, a sealing member may be interposed between the flange portions superimposed on each other.

In the aspect described above, the robot link-constituting member may include a mounting surface to which an actuator is to be fixed, and the mounting surface may be obtained by layering and joining an additional flat member onto the steel sheet constituting one of the formed members.

In the aspect described above, the robot link-constituting member may include a main body having a cylindrical shape, and the mounting surface may include two mounting surfaces respectively disposed at two ends of the main body. The main body may have a passage inside, through which a linear member can pass from one of the mounting surfaces to the other of the mounting surfaces.

In the aspect described above, at least one reinforcing member may be joined to the formed members.

In the aspect described above, the reinforcing member joined to one of the formed members may be joined to another one of the formed members.

In the aspect described above, the formed members may be obtained by press-forming high-tensile steel sheets having a tensile strength of 1000 MPa or more.

In the aspect described above, the flange portions may be joined to each other by using bolts.

In the aspect described above, the flange portions may be joined to each other by using rivets.

In the aspect described above, the flange portions may be joined to each other by using an adhesive.

In the aspect described above, at least part of outer circumferential surfaces of the formed members may be covered with an elastic material.

According to another aspect of the present invention, there is provided a robot that includes the robot link-constituting member described above.

BRIEF DESCRIPTION OF DRAWINGS

FIG. 15 is an exploded view of another modification of the robot link-constituting member illustrated in FIG. 3.

DETAILED DESCRIPTION

A robot link-constituting member and a robot 1 according to one embodiment of the present invention will now be described with reference to the drawings.

Figure 1:
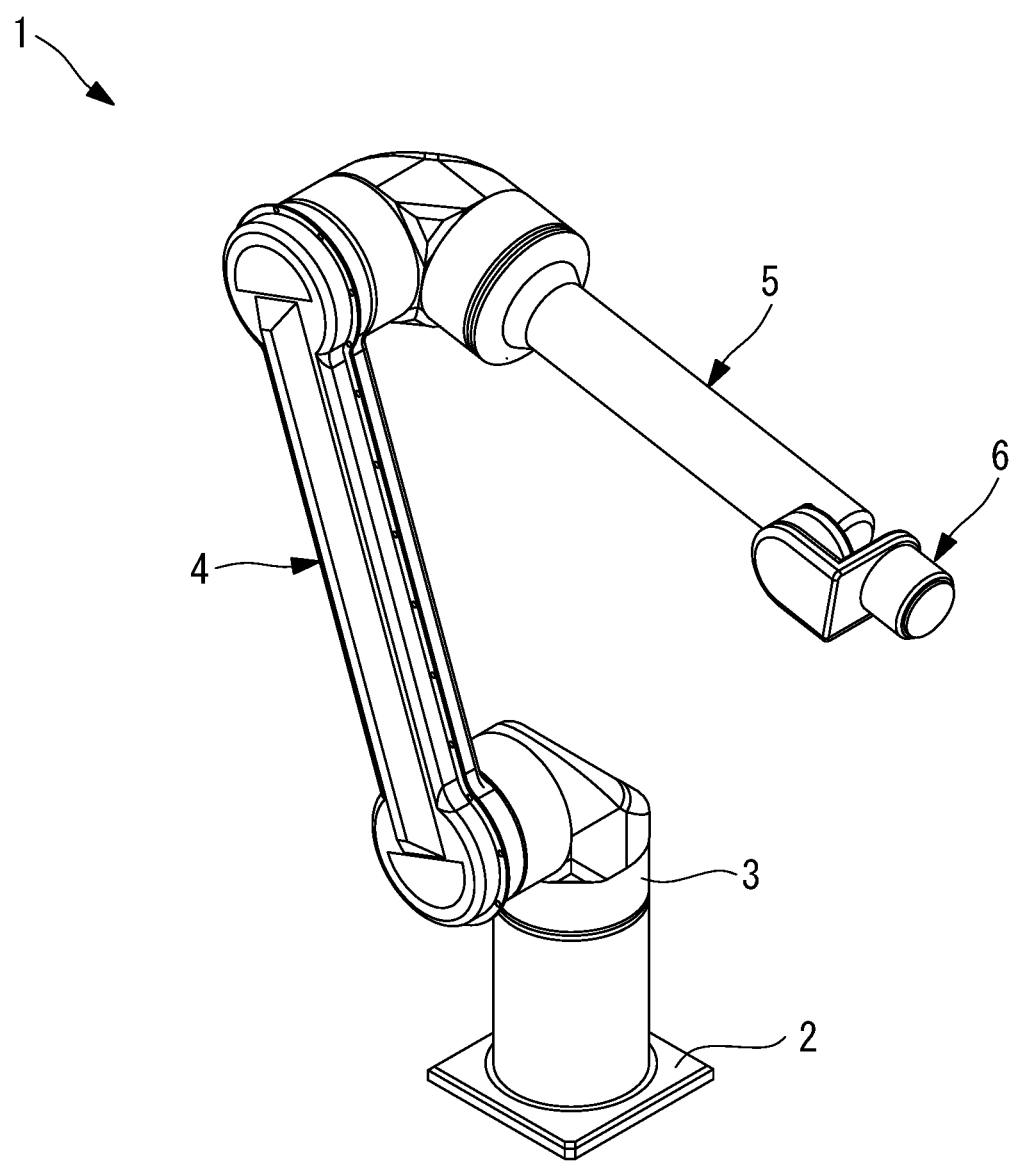
FIG. 1 is a perspective view illustrating one example of a robot according to one embodiment of the present invention.
Figure 2:
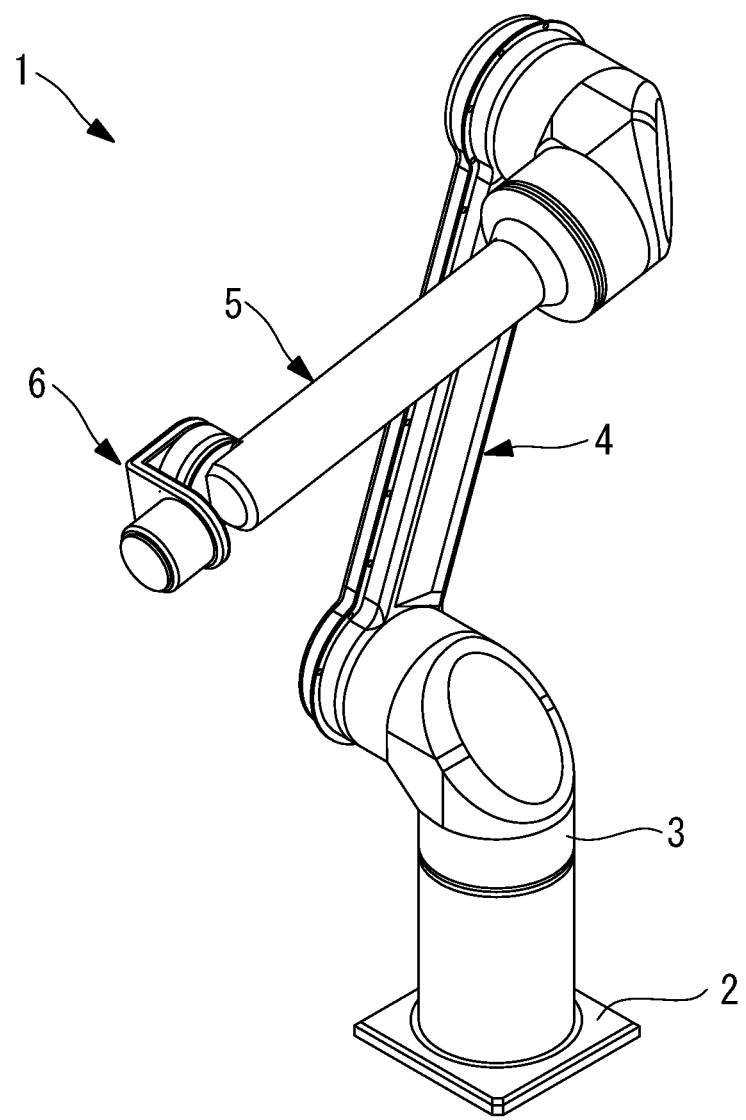
FIG. 2 is a perspective view of the robot illustrated in FIG. 1 as viewed in a different direction.
Figure 3:
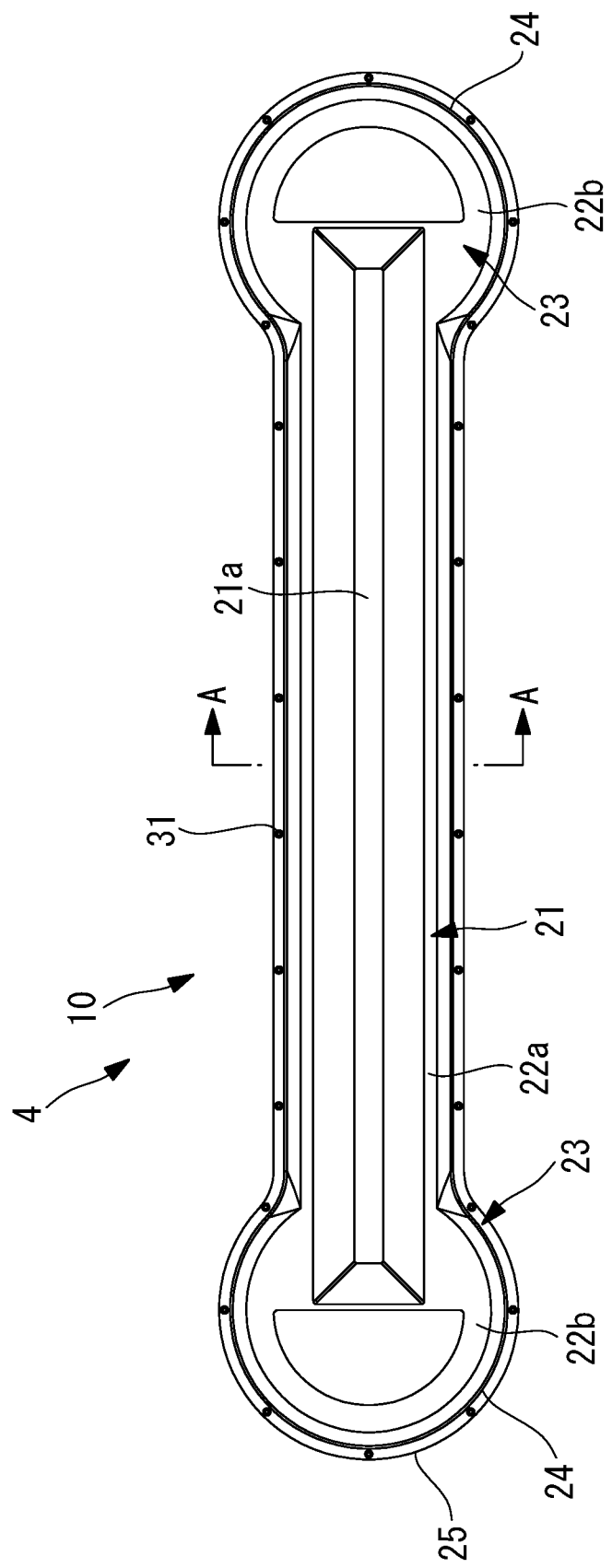
FIG. 3 is a plan view of a robot link-constituting member installed in the robot illustrated in FIG. 1.
Figure 4:
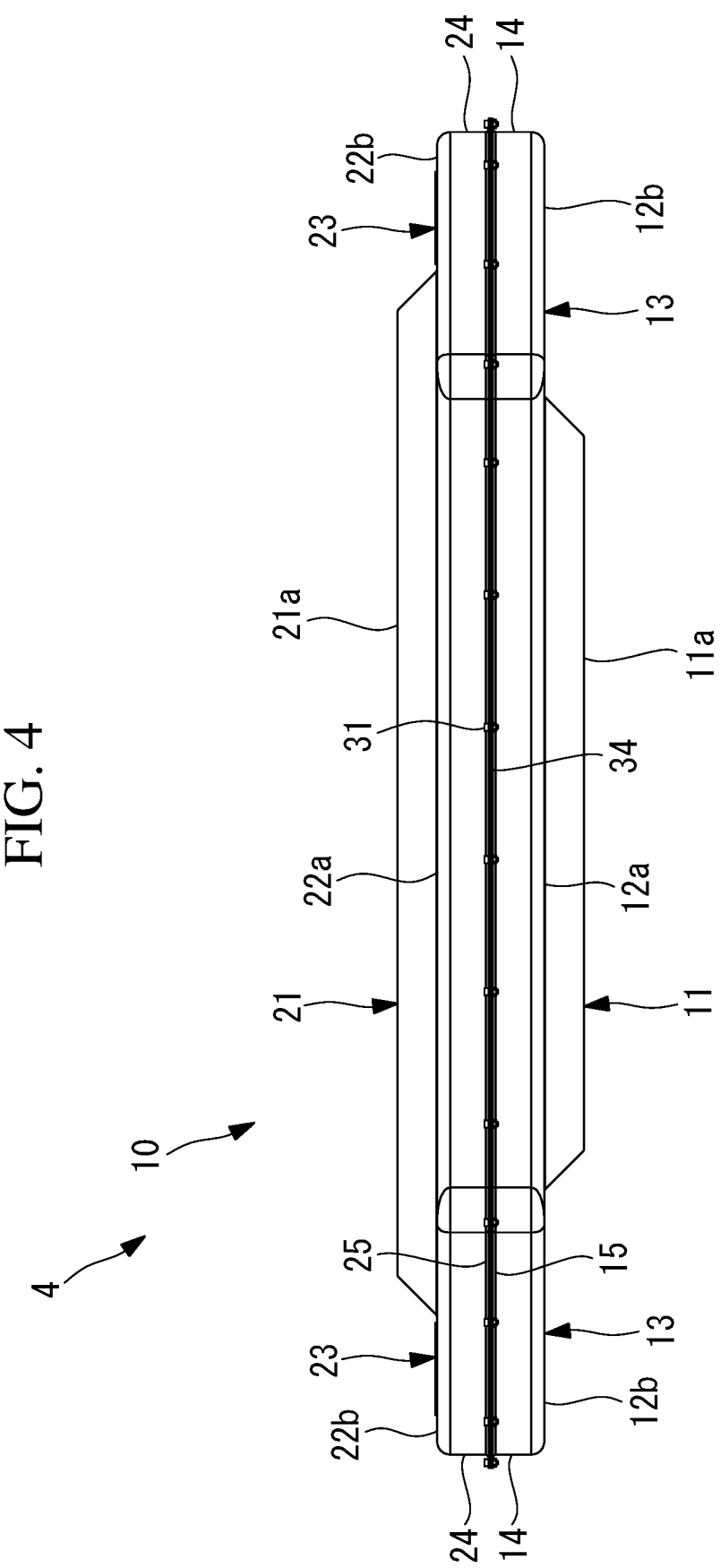
FIG. 4 is a right side view of the robot link-constituting member illustrated in FIG. 3.
Figure 5:
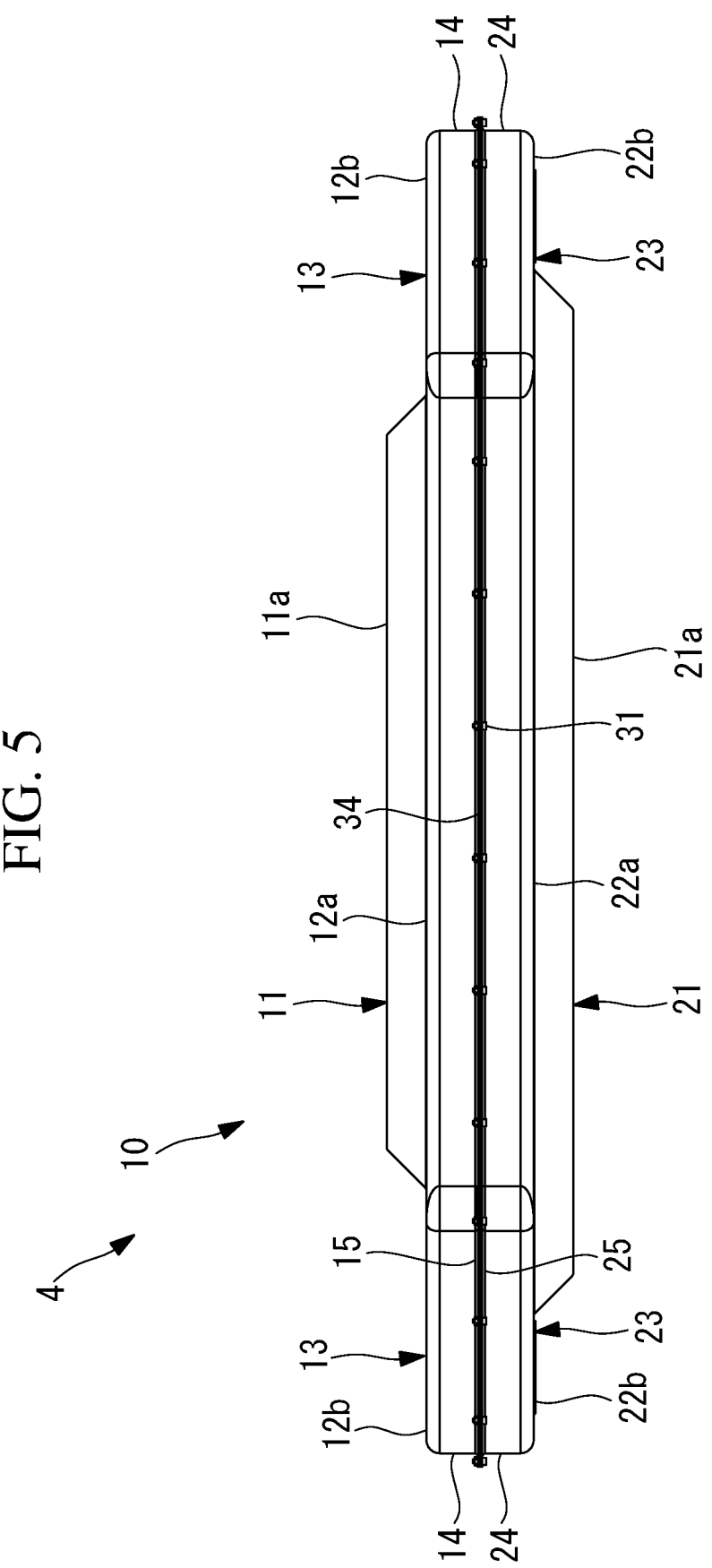
FIG. 5 is a left side view of the robot link-constituting member illustrated in FIG. 3.
Figure 6:
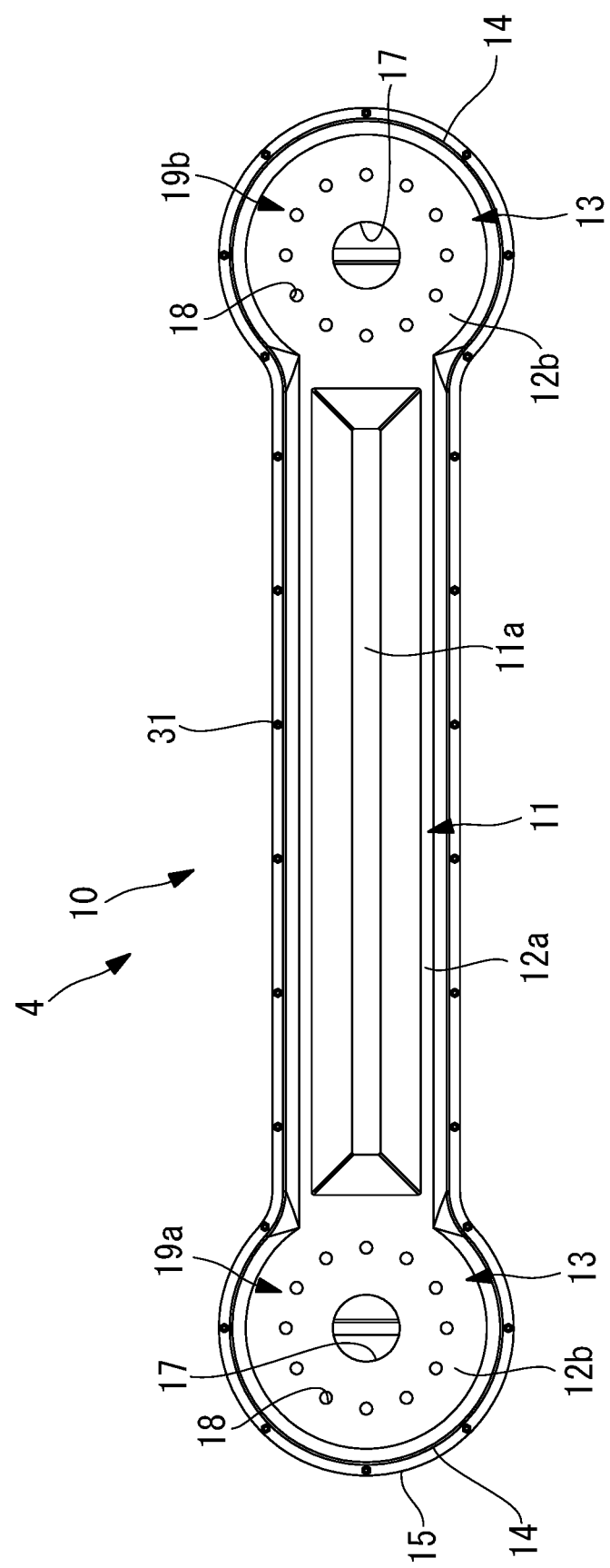
FIG. 6 is a bottom view of the robot link-constituting member illustrated in FIG. 3.
Figure 7:
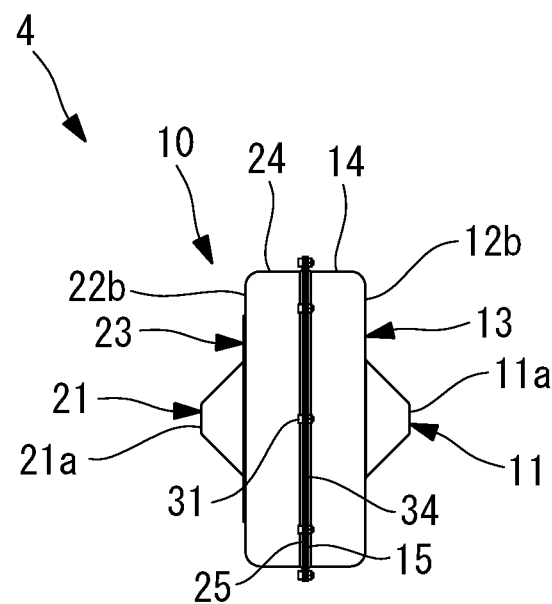
FIG. 7 is a front view of the robot link-constituting member illustrated in FIG. 3.
Figure 8:
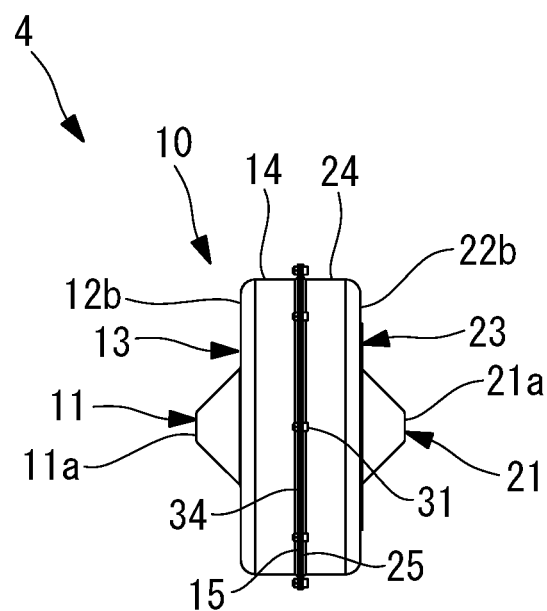
FIG. 8 is a rear view of the robot link-constituting member illustrated in FIG. 3.
Figure 9:
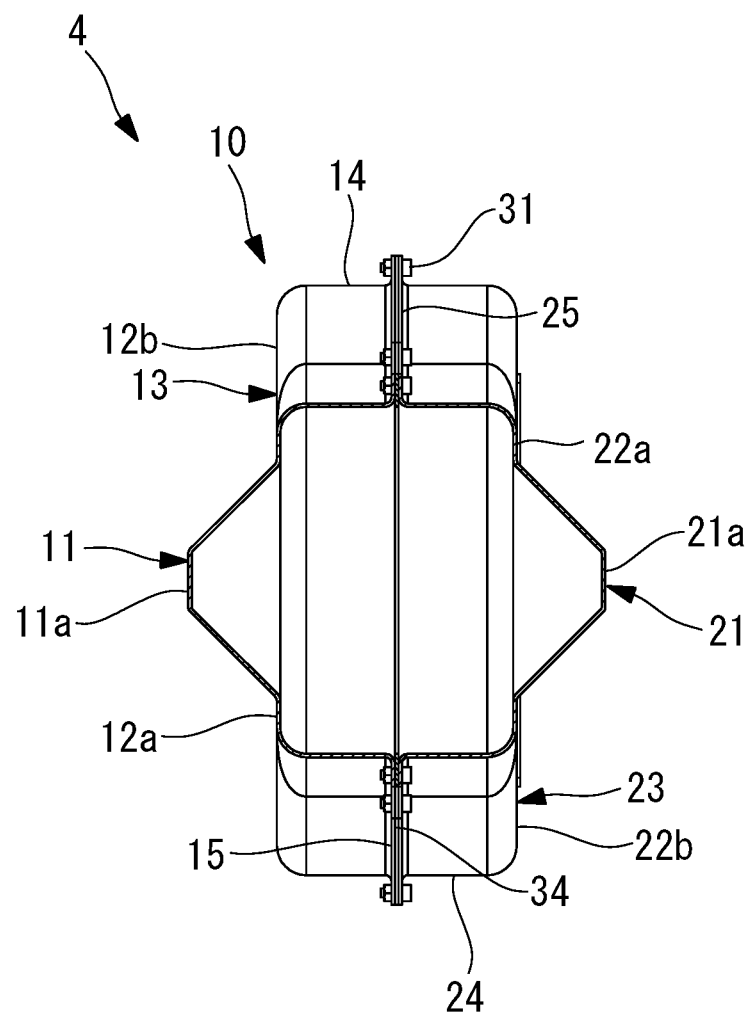
FIG. 9 is a cross-sectional view of the robot link-constituting member illustrated in FIG. 3 taken along line A-A.

As illustrated in FIGS. 1 and 2, the robot 1 of this embodiment is a vertical articulated type robot. The robot 1 is equipped with a base 2 installed on the floor, a swing barrel 3 rotatable with respect to the base 2 about a vertical axis, a first arm 4 pivotable with respect to the swing barrel 3 about a horizontal axis, a second arm 5 disposed at a tip of the first arm 4 so as to be pivotable with respect to the first arm 4 about the horizontal axis, and a wrist unit 6 mounted on a tip of the second arm 5.

A robot link-constituting member 10 according to this embodiment is, for example, a member that serves as the first arm 4. As illustrated in FIGS. 3 to 11, the robot link-constituting member 10 is a hollow-structure member constituted by joining two formed members 11 and 21 formed by press-forming steel sheets.

The steel sheets used for the formed members 11 and 21 are high-tensile steel sheets having a tensile strength of 500 MPa or more and preferably 1000 MPa or more. An example of such steel sheets is high-tensile steel sheets for automobiles.

The two formed members 11 and 21 are each formed into a channel shape by drawing a flat steel sheet through press-forming. Specifically, the formed members 11 and 21 respectively include bottom portions 13 and 23, side wall portions 14 and 24 extending upright in one thickness direction of the bottom portions 13 and 23 from the entire perimeters of the bottom portions 13 and 23, and flange portions 15 and 25 formed by outwardly bending the edges of the side wall portions 14 and 24. The bottom portion 13 is constituted by a straight, constant-width strip (main body or steel sheet) 12a and round plates (steel sheets) 12b joined to two ends of the strip 12a in the longitudinal direction and having a diameter larger than the width of the strip 12a. The bottom portion 23 is constituted by a straight, constant-width strip (main body or steel sheet) 22a and round plates (steel sheets) 22b joined to two ends of the strip 22a in the longitudinal direction and having a diameter larger than the width of the strip 22a. The side wall portions 14 and 24 have drafts that slightly spread from the bottom portions 13 and 23 toward the edges. The flange portions 15 and 25 are bent with respect to the side wall portions 14 and 24 at an angle that makes the flange portions 15 and 25 parallel to the bottom portions 13 and 23.

Figure 12:
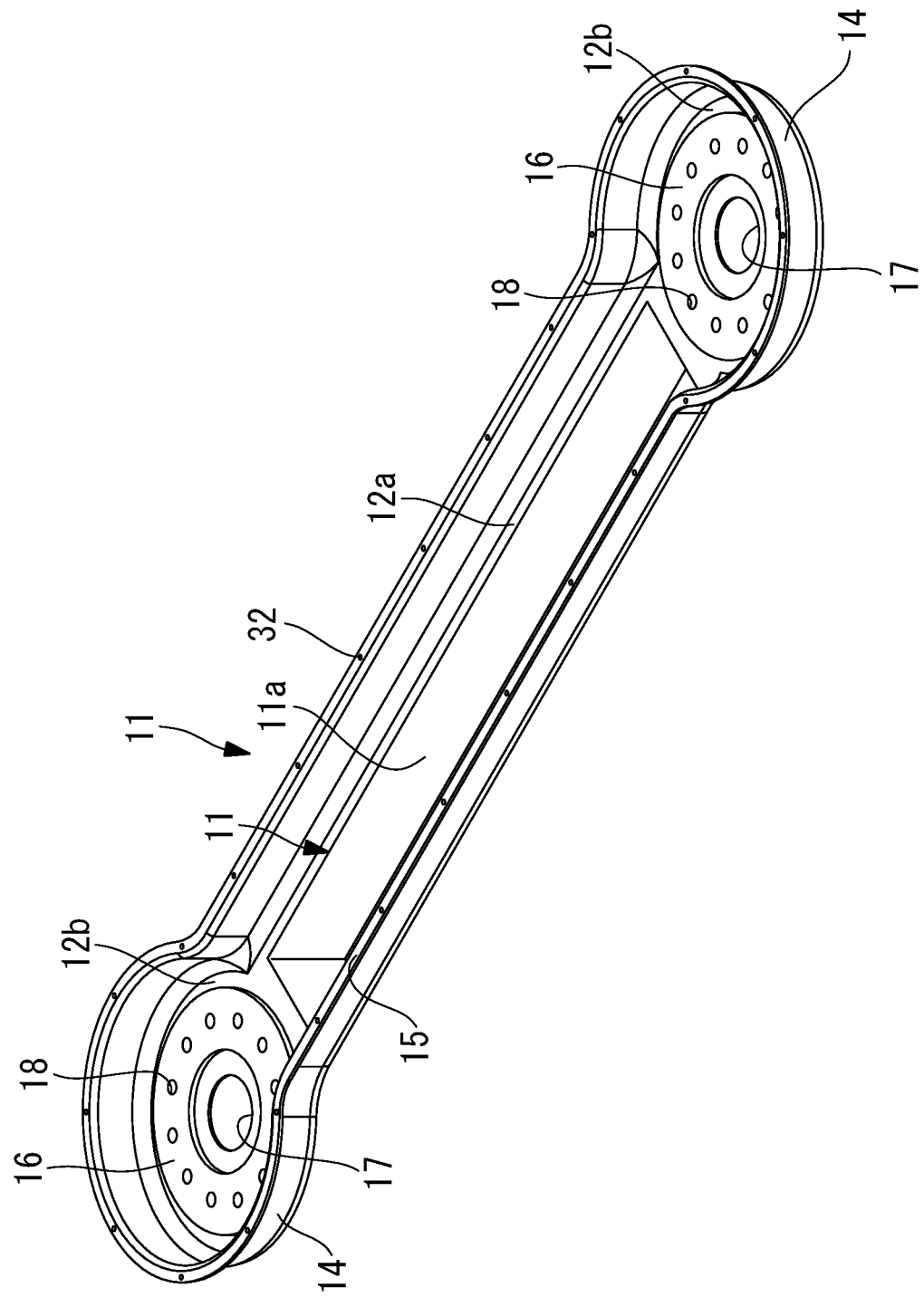
FIG. 12 is a perspective view of one of formed members that constitute the robot link-constituting member illustrated in FIG. 3.

As illustrated in FIG. 12, an additional steel sheet (flat member) 16 having a ring plate shape is joined to an inner surface of each of the round plates 12b of the formed member 11. As a result, the regions of the formed member 11 where the round plates 12b are present have a larger thickness.

Each of the round plates 12b has a through hole 17 that penetrates through the center of the circle in the thickness direction and has a predetermined size, and screw holes 18 formed on the radially outer side of the through hole 17 so as to be spaced apart from one another in the circumferential direction and extend in the thickness direction. As a result, the regions where the round plates 12b are present in the formed member 11 constitute mounting surfaces 19a and 19b to be attached to actuators.

The two mounting surfaces 19a and 19b are parallel to the longitudinal axis of the first arm 4 and lie within the same plane or parallel planes. The mounting surface 19a is for mounting the robot link-constituting member 10 on an actuator that causes the first arm 4 to pivot with respect to the swing barrel 3 as illustrated in FIG. 1. The mounting surface 19b is for mounting an actuator, which causes the second arm 5 to pivot with respect to the first arm 4 as illustrated in FIG. 1, on the robot link-constituting member 10. The actuators can be fixed to the mounting surfaces 19a and 19b by fastening bolts (not illustrated) penetrating the through holes (not illustrated) in the actuators into the screw holes 18 in the mounting surfaces 19a and 19b.

The round plates 22b of the formed member 21 are not thick and do not have through holes or screw holes.

The two formed members 11 and 21 are subjected to embossing or debossing during press forming. As a result, in the strips 12a and 22a of the bottom portions 13 and 23, portions at the center in the width direction and extending along the longitudinal direction are caused to protrude in one direction and constitute ribs 11a and 21a. The rib 21a of the formed member 21 having no through hole 17 or screw holes 18 is longer than the rib 11a of the formed member 11.

The flange portions 15 and 25 that extend all around the perimeters of the two formed members 11 and 21 are identical in shape. The formed member 11 has screw holes 32 to which bolts 31 are fastened, and the formed member 21 has through holes 33 through which the bolts 31 pass. The screw holes 32 and the through holes 33 are located at corresponding positions when the flange portions 15 and 25 are put together by matching the shapes.

Figure 10:
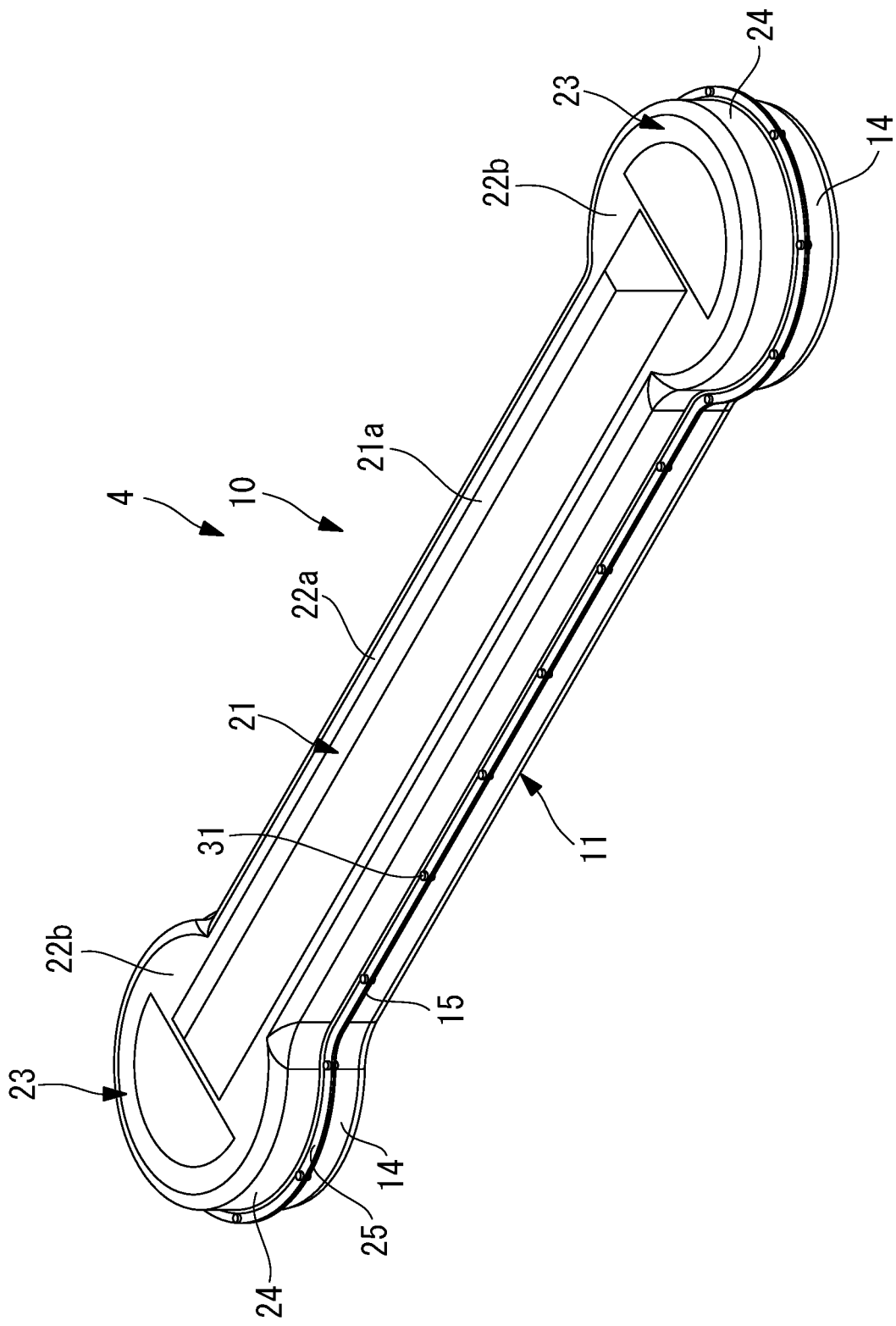
FIG. 10 is a perspective view of the robot link-constituting member illustrated in FIG. 3
Figure 11:
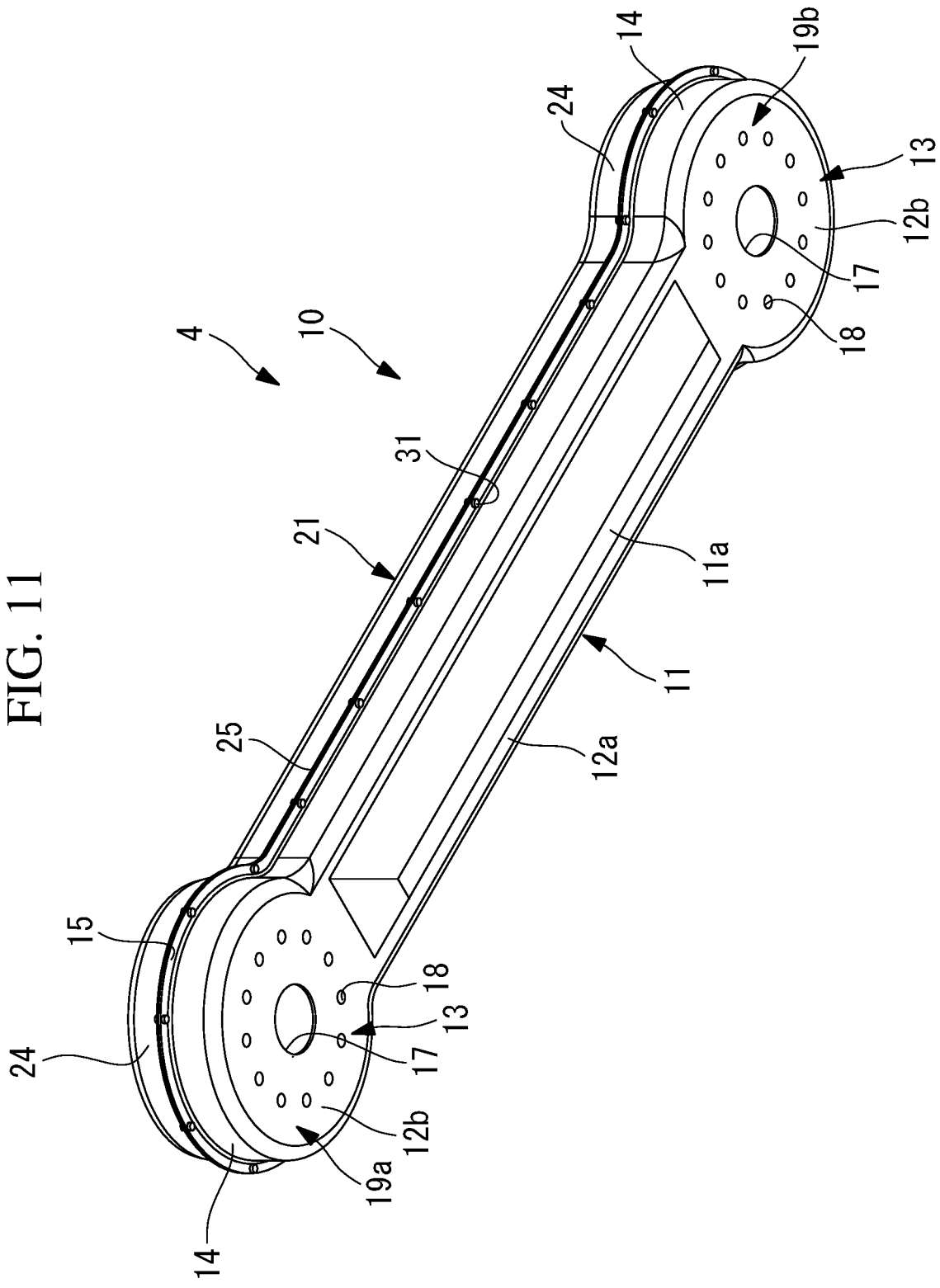
FIG. 11 is a perspective view of the robot link-constituting member illustrated in FIG. 10 as viewed in a different direction.

In this embodiment, the flange portions 15 and 25 of the formed members 11 and 21 formed into the above-described shapes by press forming, are butted against each other with a gasket (sealing member) 34 between the flange portions 15 and 25, and the bolts 31 are fastened to the screw holes 32 so as to join the two formed members 11 and 21. In this manner, as illustrated in FIGS. 10 and 11, a robot link-constituting member 10 having a hollow structure is obtained.

The advantages of the robot link-constituting member 10 of this embodiment having the aforementioned features are as follows.

The robot link-constituting member 10 of this embodiment has an advantage in that thickness thereof can be easily decreased while maintaining stiffness at an equal level to or higher level than link-constituting members of the related art formed of castings.

That is, link-constituting members formed of castings require a thickness of about 8 mm in order to achieve good fluidity. Because of this, iron castings become heavy and aluminum alloy castings are likely to suffer from defects such as cavities and pinholes. However, steel sheets do not have such disadvantages.

According to the robot link-constituting member 10 of this embodiment, the mounting surfaces 19a and 19b connected to the actuators are reinforced by joining and layering additional steel sheets 16. Thus, deformation of the mounting surfaces 19a and 19b caused by the load in the first arm 4 collapsing direction applied from the exterior can be prevented.

Figure 13:
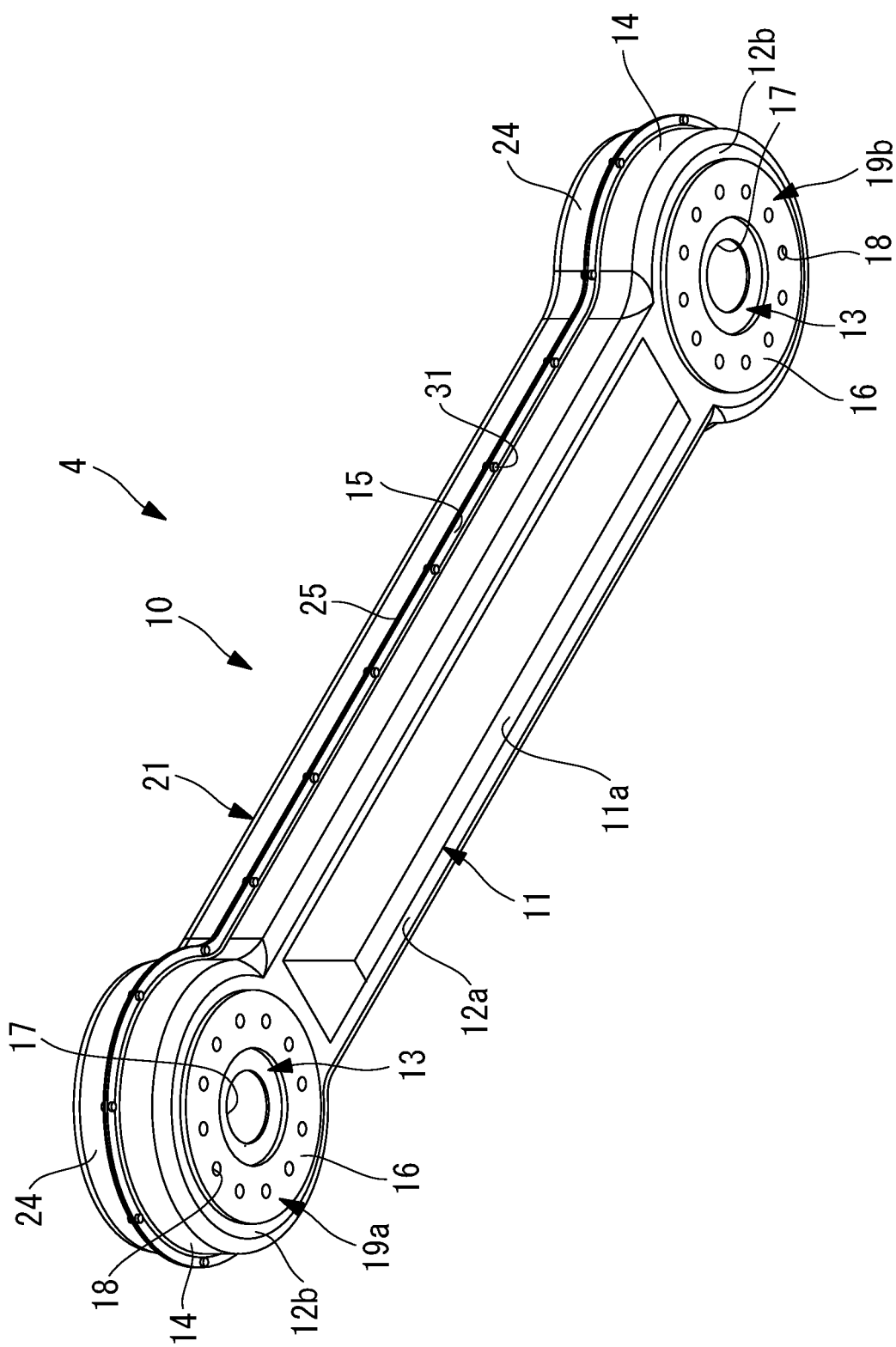
FIG. 13 is a perspective view of a modification of the robot link-constituting member illustrated in FIG. 3.

The additional steel sheets 16 layered on the round plates 13a and 13b, which are flat steel sheets constituting the mounting surfaces 19a and 19b, may be bonded to one of or both of outer and inner surfaces of the mounting surfaces 19a and 19b. In particular, as illustrated in FIG. 13, when the steel sheets 16 are joined to the outer surfaces of the mounting surfaces 19a and 19b, accuracy of parallelism and position of the two mounting surfaces 19a and 19b can be easily improved by additional work. The steel sheets 16 may be replaced by metal sheets such as aluminum sheets for weight reduction.

According to the robot link-constituting member 10 of this embodiment, the ribs 11a and 21a can be easily formed by embossing or debossing performed during press forming of the formed members 11 and 21, and the section modulus of the parts where the ribs 11a and 21a are formed can thereby be increased to further improve the stiffness of the first arm 4.

The robot link-constituting member 10 of this embodiment has another advantage in that a thin-walled hollow structure is formed by merely joining the two formed members 11 and 21, and a linear member that has entered the inner space from the through hole 17 in the mounting surface 19a can pass through the inner space and exit from the through hole 17 in the mounting surface 19b, thereby enabling wiring without exposing the linear member. The inner space can be sealed liquid-tight by sealing the gap between the two formed members 11 and 21 with the gasket (sealing member) 34.

In this embodiment, the flange portions 15 and 25 are joined by fastening the bolts 31, but the joining method is not limited to this. The flange portions 15 and 25 may be joined by any other desired method. For example, the flange portions 15 and 25 may be joined by using rivets or an adhesive. Joining by using bolts 31, rivets, or an adhesive is advantageous over joining by welding since residual stress attributable to heat shrinkage does not occur, and the formed members 11 and 21 can be more easily and securely joined.

Figure 14:
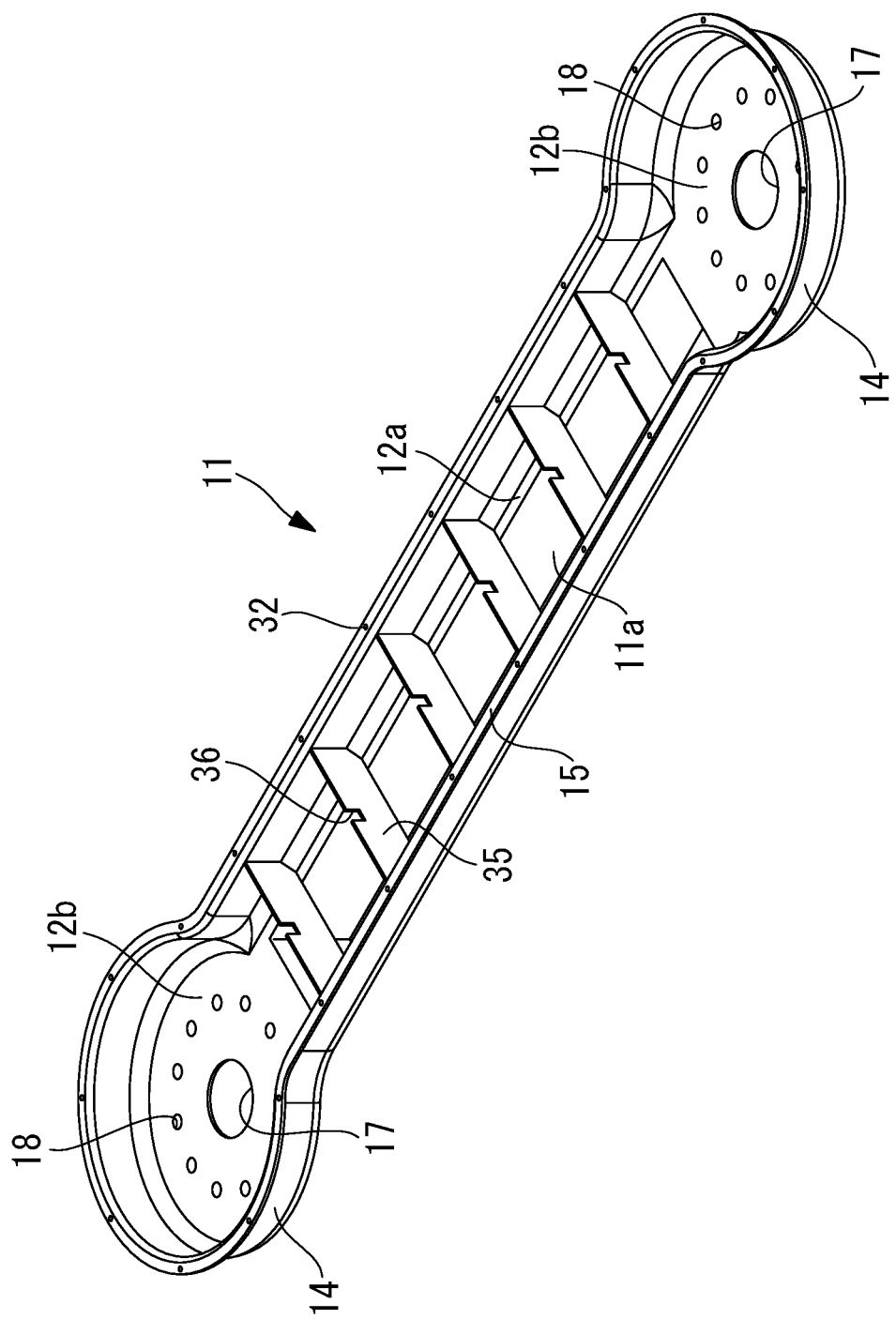
FIG. 14 is a perspective view of a modification of one of the formed members illustrated in FIG. 12.
Figure 16A:
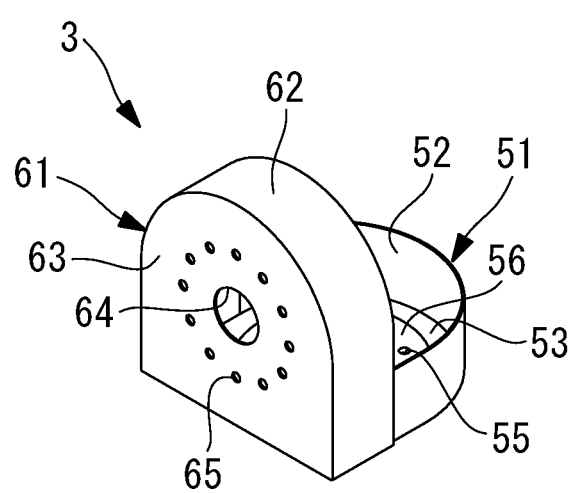
FIG. 16A is a perspective view of a modification of a swing barrel installed in the robot illustrated in FIG. 1.
Figure 16B:
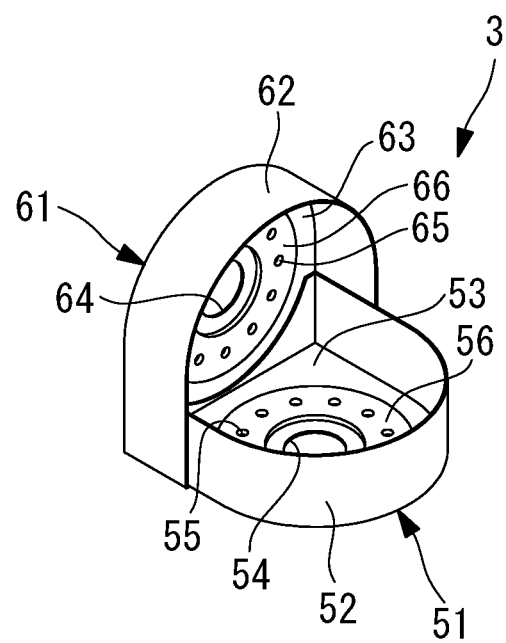
FIG. 16B is a perspective view of the modification of the swing barrel installed in the robot illustrated in FIG. 1 as viewed in a different direction from FIG. 16A.
Figure 16C:
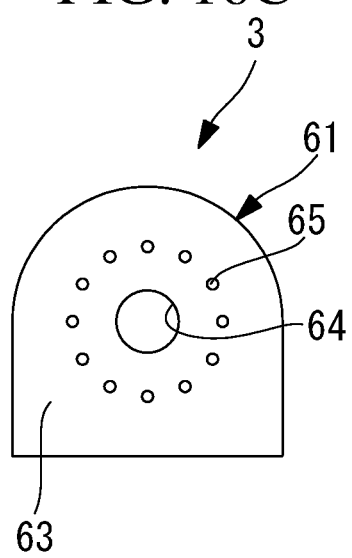
FIG. 16C is a rear view of the modification of the swing barrel installed in the robot illustrated in FIG. 1.
Figure 16D:
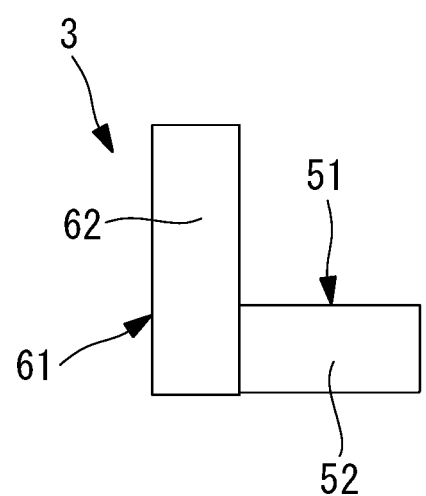
FIG. 16D is a side view of the modification of the swing barrel installed in the robot illustrated in FIG. 1.
Figure 16E:
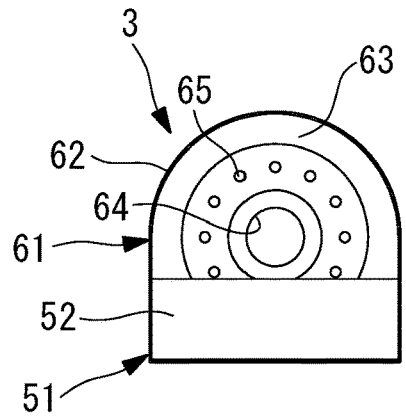
FIG. 16E is a front view of the modification of the swing barrel installed in the robot illustrated in FIG. 1.
Figure 16F:
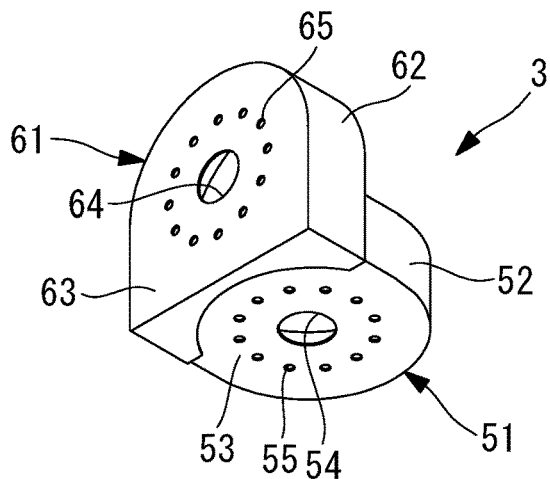
FIG. 16F is a perspective view of the modification of the swing barrel installed in the robot illustrated in FIG. 1 as viewed in a direction different from FIGS. 16A and 16B.
Figure 16G:
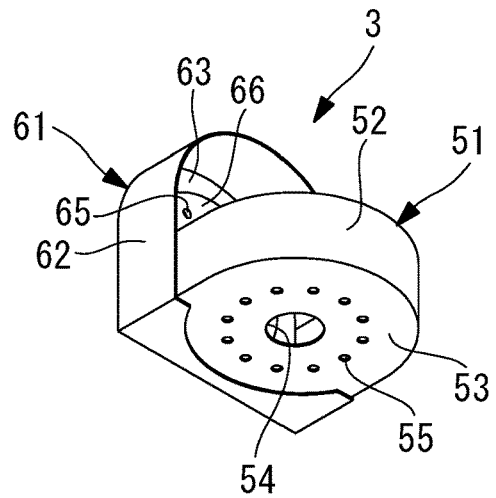
FIG. 16G is a perspective view of the modification of the swing barrel installed in the robot illustrated in FIG. 1 as viewed in a direction different from FIGS. 16A, 16B, and 16F.

As illustrated in FIGS. 14 and 15, additional steel sheets that serve as ribs (reinforcing members) 35 and 37 may be joined to appropriate positions inside the formed members 11 and 21. In the example illustrated in FIG. 14, multiple ribs 35 spaced from one another in the longitudinal direction of the first arm 4 are disposed so as to be parallel to one another. The stiffness of the first arm 4 can thereby be improved. In FIG. 14, cutouts 36 formed at the center of each rib 35 are provided to form a passage of a linear member when the two formed members 11 and 21 are joined together to form a cylindrical structure.

In the example illustrated in FIG. 15, screw holes 40 are formed in the ribs 37 joined to the formed member 11, and bolts 42 passing through through holes 41 in the formed member 21 are fastened to the screw holes 40 in the ribs 37 so that the formed member 21 also is joined to the same ribs 37 by the bolts 42. A through hole 38 formed near the center of each rib 37 is provided to form a passage for a linear member. The ribs 37 may be composed of a metal such as aluminum for weight reduction.

In this embodiment, the first arm 4 is described as an example of the robot link-constituting member 10. Alternatively, as illustrated in FIGS. 16A to 18, other members, such as the swing barrel 3 and the second arm 5, may be constituted by a combination of formed members 51 and 61 obtained by press forming.

Specifically, for example, as illustrated in FIGS. 16A to 18, the swing barrel 3 may be obtained by joining a first formed member 51, which is to be fixed to an output shaft of a reducer attached to the base 2, and a second formed member 61, which is to be attached to the first arm 4 with the reducer therebetween.

The formed members 51 and 61 are press-formed into box shapes that have bottom portions (steel sheets) 53 and 63 having a combined semicircle and a rectangle shape, and side wall portions (steel sheets) 52 and 62 that extend upright in one direction from the edges of the bottom portions 53 and 63. The bottom portions 53 and 63 constitute annular mounting surfaces that have center holes 54 and 64 through which a linear member passes, and multiple through holes 55 and 65 disposed on the radially outer side of the center holes 54 and 64 so as to be spaced apart from one another in the circumferential direction. The mounting surfaces are reinforced by additional ring-shaped steel sheets (flat members) 56 and 66 joined and layered on the mounting surfaces. The formed member can be fixed to a reducer by aligning the center axes of the center holes 54 and 64 with the center axes of the reducer and by using bolts (not illustrated) passing through the through holes 55 and 65.

Figure 17:
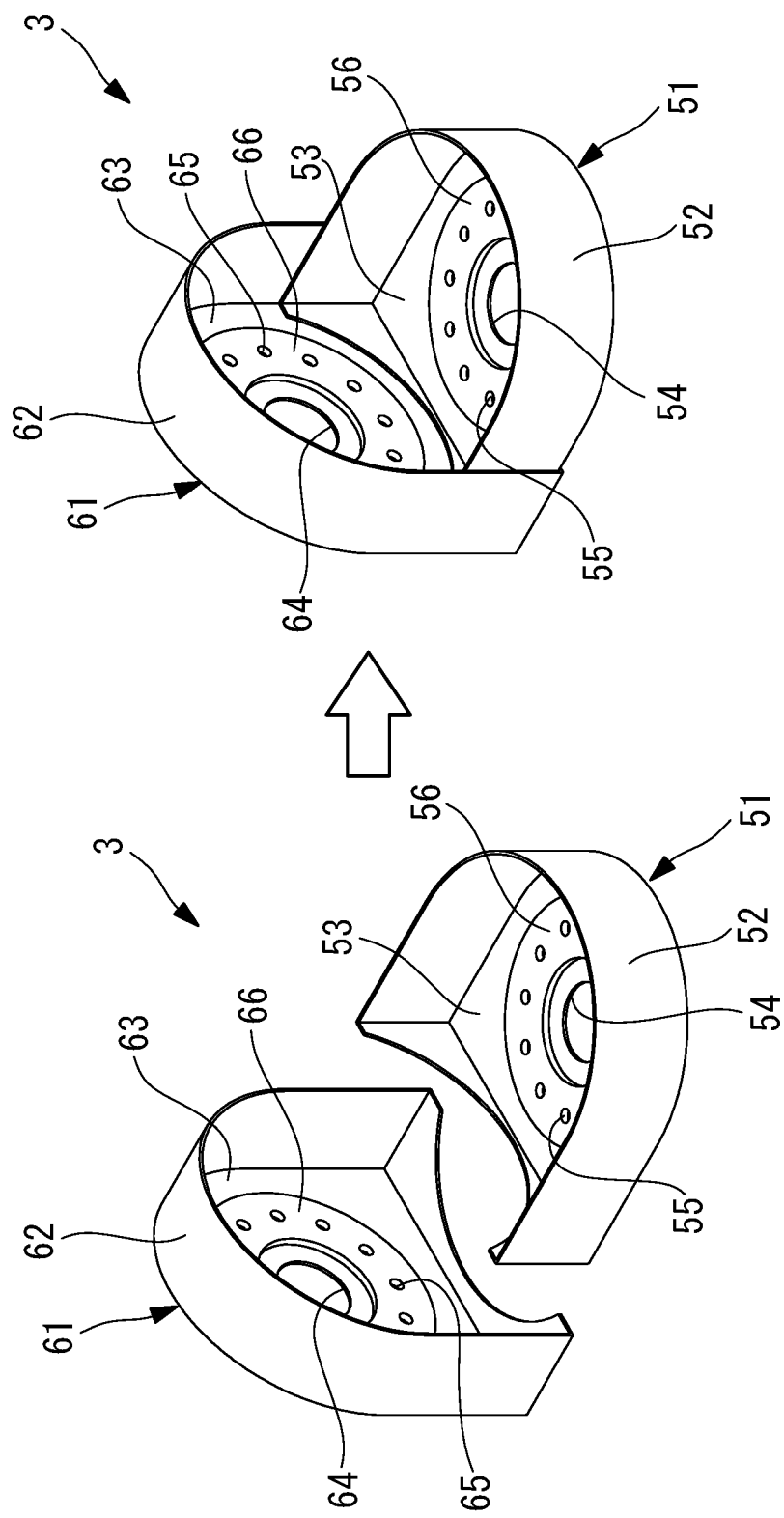
FIG. 17 is a perspective view illustrating two formed members constituting the swing barrel illustrated in FIGS. 16A to 16G before and after joining.
Figure 18:
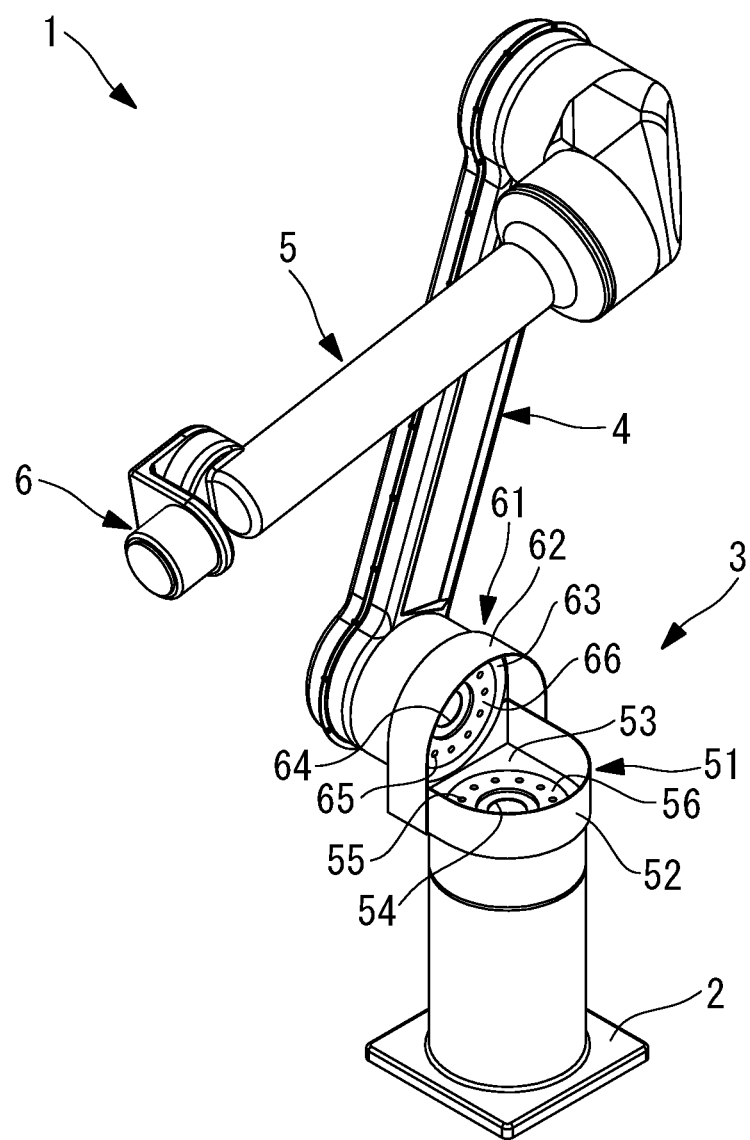
FIG. 18 is a perspective view of a robot equipped with the swing barrel illustrated in FIGS. 16A to 16G.

The first formed member 51 has a width slightly smaller than the second formed member 61. As illustrated in FIG. 17, the formed members 51 and 61 are joined to each other while partly inserting the first formed member 51 into the inner side of the second formed member 61, and, as a result, a swing barrel 3 in which two mounting surfaces are orthogonally arranged is obtained.

Arc-shaped cutouts are formed in one part of the side wall portions 52 and 62 of the formed members 51 and 61. Due to the cutouts, when the two formed members 51 and 61 are combined, the side wall portions 52 and 62 are prevented from overlapping the mounting surfaces of other formed members 61 and 51.

Although an example of joining two formed members 11 and 21 is described, three or any desired greater number of formed members 11 and 21 may be joined to constitute the robot link-constituting member 10.

At least part of the outer circumferential surface of the robot link-constituting member 10 may be covered with an elastic material such as urethane rubber. This affords an advantage in that workers nearby can be prevented from coming into direct contact with the steel sheets.

The projecting edge portions of the flange portions 15 and 25 may be covered with an elastic material so as to eliminate edge portions.

As a result, the following aspect is derived from the above described embodiment.

According to one aspect of the present invention, there is provided a hollow-structure robot link-constituting member obtained by joining at least two formed members formed by press-forming steel sheets.

According to this aspect, compared to when the robot link-constituting member is formed of castings, the thickness can be easily reduced and high strength can be maintained by forming a hollow structure by joining at least two formed members obtained by press-forming steel sheets. In this manner, significant weight reduction can be achieved compared to iron castings, and occurrence of defects can be reduced compared to aluminum alloy castings.

In the aspect described above, the formed members may each have a rib on a surface, the rib being formed by an irregularity on the surface.

According to this feature, a rib may be formed by an irregularity on the surface by embossing or debossing by deformation work during press forming of the steel sheets to thereby increase the section modulus of the portion where the rib is present. Alternatively, a weld overlay may be formed on an outer circumferential surface or inner circumferential surface of each formed member so as to directly add a rib, or an additional member may be welded to form a rib. In this manner, the stiffness of the robot link-constituting member can be improved.

In the aspect described above, each the formed members may have flange portions around perimeters, the flanged portions being superimposed on each other and joined to each other.

According to this feature, a hollow-structure robot link-constituting member having an increased joint strength can be obtained by joining the formed members while superimposing the flanged portions of the formed members on each other, and the joined flanged portions can serve as a rib to improve the stiffness.

In the aspect described above, a sealing member may be interposed between the flange portions superimposed on each other.

According to this feature, the inner space of the hollow-structure robot link-constituting member can be sealed from the exterior.

In the aspect described above, the robot link-constituting member may include a mounting surface to which an actuator is to be fixed, and the mounting surface may be obtained by layering and joining an additional flat member onto the steel sheet constituting one of the formed members.

According to this feature, the additional flat member layered onto the steel sheet constituting the formed member can reinforce the mounting surface to which a torque from the actuator is applied. When the additional flat member is layered on the actuator side, additional work may be performed to improve accuracy of the mounting surface.

In the aspect described above, the robot link-constituting member may include a main body having a cylindrical shape, and the mounting surface may include two mounting surfaces respectively disposed at two ends of the main body. The main body may have a passage inside, through which a linear member can pass from one of the mounting surfaces to the other of the mounting surfaces.

According to this feature, the linear member can be laid-out in the passage inside the cylindrical main body between the two mounting surfaces. The linear member can be prevented from being exposed on the arm surface and from obstructing the movement of the arm.

In the aspect described above, at least one reinforcing member may be joined to the formed members.

According to this feature, the section modulus in the region where the reinforcing member is joined can be increased and the stiffness of the robot link-constituting member can be improved.

In the aspect described above, the reinforcing member joined to one of the formed members may be joined to another one of the formed members.

According to this feature, since two formed members are joined to each other also by the reinforcing member, the stiffness of the robot link-constituting member can be further improved.

In the aspect described above, the formed members may be obtained by press-forming high-tensile steel sheets having a tensile strength of 1000 MPa or more.

According to this feature, the thickness of the steel sheets constituting the formed member can be further reduced, and further weight reduction can be achieved while maintaining high stiffness.

In the aspect described above, the flange portions may be joined to each other by using bolts.

According to this feature, the formed members can be more easily and securely joined to each other with the bolts without performing welding, which readily generates residual stress due to heat shrinkage.

In the aspect described above, the flange portions may be joined to each other by using rivets.

According to this feature, the formed members can be more easily and securely joined to each other with the rivets without performing welding, which readily generates residual stress due to heat shrinkage.

In the aspect described above, the flange portions may be joined to each other by using an adhesive.

According to this feature, the formed members can be more easily and securely joined to each other with the adhesive without performing welding, which readily generates residual stress due to heat shrinkage.

In the aspect described above, at least part of outer circumferential surfaces of the formed members may be covered with an elastic material.

According to this feature, workers and the like nearby can be prevented from coming into direct contact with the formed members at the part covered with the elastic material.

According to another aspect of the present invention, there is provided a robot that includes the robot link-constituting member described above.

REFERENCE SIGNS LIST 1 robot
10 robot link-constituting member
11, 21, 51, 61 formed member
11a, 21a rib
12a, 22a strip (steel sheet or main body)
12b, 22b round plate (steel sheet)
15, 25 flange portion
16, 56, 66 steel sheet (flat member)
19a, 19b mounting surface
31 bolt
34 gasket (sealing material)
35, 37 rib (reinforcing member)
52, 62 side wall portion (steel sheet)
53, 63 bottom portion (steel sheet)

The invention claimed is:

1. Hollow-structure robot link-constituting member, comprising:
   at least two formed members used for a main body, wherein
   the at least two formed members are each formed into a channel shape by drawing a flat steel sheet through press-forming and are joined to form the hollow structure.

2. The robot link-constituting member according to claim 1, wherein the formed members each has a rib on a surface, the rib being formed by an irregularity on the surface.

3. The robot link-constituting member according to claim 1, wherein each the formed members have flange portions around perimeters, the flanged portions being superimposed on each other and joined to each other.

4. The robot link-constituting member according to claim 3, wherein a sealing member is interposed between the flange portions superimposed on each other.

5. The robot link-constituting member according to claim 1, further comprising a mounting surface to which an actuator is to be fixed,
   wherein the mounting surface is obtained by layering and joining an additional flat member onto the steel sheet constituting one of the formed members.

6. The robot link-constituting member according to claim 5, further comprising a main body having a cylindrical shape,
   wherein the mounting surface includes two mounting surfaces respectively disposed at two ends of the main body, and
   the main body has a passage inside, through which a linear member can pass from one of the mounting surfaces to the other of the mounting surfaces.

7. The robot link-constituting member according to claim 1, wherein at least one reinforcing member is joined to the formed members.

8. The robot link-constituting member according to claim 7, wherein the reinforcing member joined to one of the formed members is joined to another one of the formed members.

9. The robot link-constituting member according to claim 1, wherein the formed members are obtained by press-forming high-tensile steel sheets having a tensile strength of 1000 MPa or more.

10. The robot link-constituting member according to claim 3, wherein the flange portions are joined to each other by using bolts.

11. The robot link-constituting member according to claim 3, wherein the flange portions are joined to each other by using rivets.

12. The robot link-constituting member according to claim 3, wherein the flange portions are joined to each other by using an adhesive.

13. The robot link-constituting member according to claim 1, wherein at least part of outer circumferential surfaces of the formed members is covered with an elastic material.

14. A robot comprising the robot link-constituting member according to claim 1.

15. The robot link-constituting member according to claim 1, which is a cantilevered structure.

16. A hollow-structure robot link-constituting member, comprising:
   at least two formed members used for a main body, wherein
   the at least two formed members are each formed into a channel shape by drawing a flat steel sheet through press-forming and are joined to form the hollow structure, excluding reinforcing members.

* * * * *